(12) United States Patent  
Pignataro et al.

(10) Patent No.: US 8,782,212 B2  
(45) Date of Patent: Jul. 15, 2014

(54) DETECTING WHETHER COMPONENTS ARE FUNCTIONING TOGETHER ACCORDING TO AN OPERATING HYBRID SOLUTION

(75) Inventors: Carlos M. Pignataro, Raleigh, NC (US); Marc Holloman, Apex, NC (US); Scott Crowns, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 13/024,167

(22) Filed: Feb. 9, 2011

(65) Prior Publication Data  
US 2012/0203892 A1  Aug. 9, 2012

(51) Int. Cl.  
G06F 15/16 (2006.01)  
H04L 29/08 (2006.01)

(52) U.S. Cl.  
CPC .................................. H04L 67/26 (2013.01)  
USPC .......................................................... 709/224

(58) Field of Classification Search  
CPC ......... H04L 67/26; H04L 67/34; H04L 41/22; H04L 67/10008; G06Q 10/06  
USPC ......................................... 709/203, 224, 223  
See application file for complete search history.

(56) References Cited

U.S. PATENT DOCUMENTS

| | | | | |
|---|---|---|---|---|
| 7,966,391 B2* | 6/2011 | Anderson et al. | ............ | 709/223 |
| 8,125,328 B2* | 2/2012 | Sartini et al. | ............ | 340/517 |
| 8,156,208 B2* | 4/2012 | Bornhoevd et al. | ............ | 709/221 |
| 2008/0005572 A1* | 1/2008 | Moskowitz | ............ | 713/176 |
| 2009/0031286 A1* | 1/2009 | Yee et al. | ............ | 717/120 |
| 2009/0119779 A1* | 5/2009 | Dean et al. | ............ | 726/26 |
| 2010/0077072 A1* | 3/2010 | Guruswamy et al. | ............ | 709/224 |
| 2010/0118844 A1* | 5/2010 | Jiao et al. | ............ | 370/338 |
| 2010/0122175 A1* | 5/2010 | Gupta et al. | ............ | 715/735 |
| 2011/0072127 A1* | 3/2011 | Gerber et al. | ............ | 709/224 |
| 2012/0110160 A1* | 5/2012 | Papadopoulos | ............ | 709/224 |
| 2012/0296968 A1* | 11/2012 | Lin et al. | ............ | 709/204 |
| 2013/0007624 A1* | 1/2013 | Hasan et al. | ............ | 715/736 |
| 2013/0155841 A1* | 6/2013 | Engebretsen et al. | ............ | 370/218 |

OTHER PUBLICATIONS

"Cisco: Leading the Way to Borderless Networks" White Paper dated 2010 (10 pages).  
"Medianet Reference Guide" updated Oct. 26, 2010 (280 pages).

* cited by examiner

*Primary Examiner* — Ario Etienne  
*Assistant Examiner* — Uzma Alam  
(74) *Attorney, Agent, or Firm* — Hickman Palermo Truong Becker Bingham Wong LLP

(57) ABSTRACT

A method and apparatus for identifying operating hybrid solutions is provided. An operating hybrid solution includes a combination of hardware and software components operating together for a particular purpose, such as to provide particular functionality. In various embodiments, mappings are stored to associate operating hybrid solutions with operating criteria that describe devices when the devices are operating according to the operating hybrid solutions. During operation of a device, a monitoring process uses the mappings to determine whether the device is operating as part of an operating hybrid solution. The monitoring process stores an indication of whether the device is operating as part of the operating hybrid solution, and the indication may be provided in response to a request for operating hybrid solution information associated with the device.

27 Claims, 5 Drawing Sheets

DETECTING WHETHER COMPONENTS ARE FUNCTIONING TOGETHER ACCORDING TO AN OPERATING HYBRID SOLUTION

TECHNICAL FIELD

The present disclosure generally relates to network management, network operations and network support. The disclosure relates more specifically to identifying in networks the presence of particular combinations of equipment, software, protocols and other internetworking and networking technologies that may be associated with marketing names or identifiers or marketing bundles.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data processing networks may include a variety of devices with a variety of capabilities. The devices may be of different models, obtained from different manufacturers, and used by customers in different ways. Example devices include routers, switches, general purpose computers, server computers, printers, scanners, fax machines, Voice over IP ("VoIP") phones, mobile devices such as smart phones, and other devices connected to the network. At any given time, customers generally do not use all of the capabilities of all of their devices.

The devices may host or run different software, protocols, or other functional units. The devices may be configured to implement particular protocols, technologies or techniques in many different ways. A particular combination of one or more devices, software, configuration, technologies, protocols, functional units, or services may be associated with a particular name or marketing identifier of the vendor that supplied one or more of the units.

In order to manage, maintain, operate, service, or troubleshoot devices, for auditing purposes, or to analyze the effectiveness and efficiency of solutions, the vendors of network gear, customers and support service providers may want to know whether a given device is part of a hardware-based, software-based, and/or service-based solution that addresses a particular customer need. Customers and support service providers often assume that the devices are part of a hardware-based and/or software-based solution merely because the devices have manufacturer names and model numbers that are expected to be part of the solution. This assumption is inaccurate when devices that are typically part of a solution are not actually operating as part of the solution. An incorrect assumption may require extensive investigation of the configuration of the customer's devices, or may complicate the process of providing service or support to the customer or the devices.

DETAILED DESCRIPTION

Figure 1:
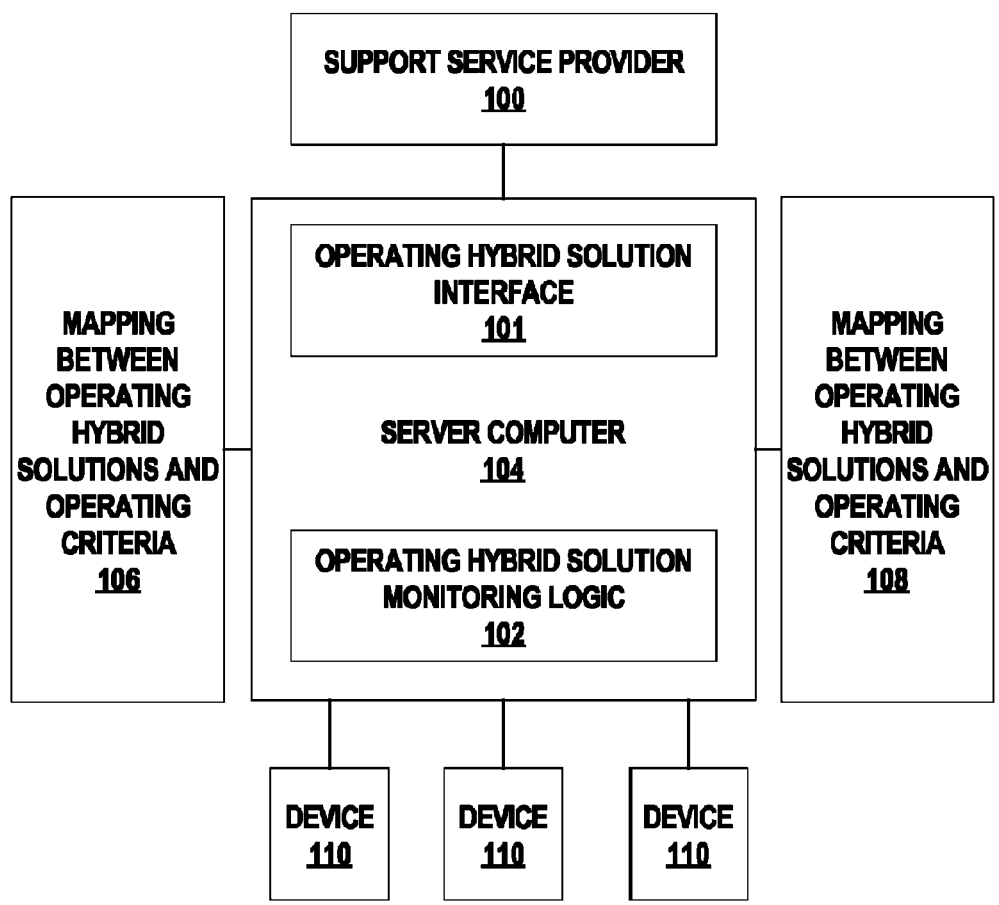
FIG. 1 illustrates an example server that maintains stored associations between devices and operating hybrid solutions to which the devices are a part.

Identifying operating hybrid solutions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Identifying Operating Hybrid Solutions
   3.1 Process of Detecting Whether Devices Have Operating Criteria Specified by a Mapping
   3.2 Process of Handling Requests for Operating Hybrid Solutions Associated with a Device
4.0 Implementation Mechanisms—Hardware Overview
5.0 Extensions and Alternatives

1.0 General Overview

In an embodiment, one or more non-transitory computer-readable storage media store a mapping between an operating hybrid solution and two or more operating criteria of one or more internetworking devices; instructions which, when executed by one or more processors, cause: receiving a request for operating hybrid solution information associated with a particular device; during operation of the particular device, detecting whether the particular device has each of the two or more operating criteria and, in response thereto, storing an indication of whether the particular device is operating according to the operating hybrid solution; sending a response to the request, wherein the response indicates whether the particular device is operating according to the operating hybrid solution.

In an embodiment, a method comprises storing a mapping between an operating hybrid solution and two or more operating criteria of one or more internetworking devices; receiving a request for operating hybrid solution information associated with a particular device; during operation of the particular device, detecting whether the particular device has each of the two or more operating criteria and, in response thereto, storing an indication of whether the particular device is operating according to the operating hybrid solution; sending a response to the request, wherein the response indicates whether the particular device is operating according to the operating hybrid solution; wherein the method is performed by one or more computing devices.

In an embodiment, one or more computing devices comprise one or more processors; one or more non-transitory computer-readable storage media storing: a mapping between an operating hybrid solution and two or more operating criteria of one or more internetworking devices; solution monitoring logic coupled to the one or more processors, wherein the solution monitoring logic is configured to cause: receiving a request for operating hybrid solution information associated with a particular device; during operation of the particular device, detecting whether the particular device has each of the two or more operating criteria and, in response thereto, storing an indication of whether the particular device is operating according to the operating hybrid solution; sending a response to the request, wherein the response indicates whether the particular device is operating according to the operating hybrid solution.

In another embodiment, a computer apparatus is configured with logic to carry out the foregoing steps. In yet another embodiment, a non-transitory computer-readable medium stores instructions that cause one or more processors to execute the foregoing steps.

2.0 Structural and Functional Overview

In an embodiment, an operating hybrid solution includes a combination of hardware, software, and/or service-based components operating together for a particular purpose, such as to provide particular functionality. In various embodiments, mappings are stored to associate operating hybrid solutions with runtime criteria and/or boottime criteria that describe devices when the devices are operating according to the operating hybrid solutions. For example, the mappings may associate an operating hybrid solution with runtime criteria that is set or satisfied after the device boots. As another example, the mappings may associate an operating hybrid solution with boottime criteria that is persistent with respect to one or more reboots of the device. Runtime criteria and/or boottime criteria are examples of operating criteria.

During operation of a device, a monitoring process uses the mappings to determine whether the device is operating as part of an operating hybrid solution. The monitoring process stores an indication of whether the device is operating as part of the operating hybrid solution, and the indication may be provided in response to a request for operating hybrid solution information associated with the device.

Operating hybrid solutions are provided by a combination of hardware, software, and/or service-based components that operate together for a particular purpose, to solve a particular problem, to provide a particular functionality, and/or according to a particular theme. Operating hybrid solutions may be marketed, advertised, and sold to customers based on the particular purpose, the particular problem solved, the particular functionality, and/or the particular theme of the solution. In one example, a solution is offered to customers as a software upgrade to one or more existing devices. In another example, a solution is offered to the customer in the form of one or more devices that are specially configured to accomplish a functionality that supports the solution. In yet another example, a solution is offered to the customer in the form of a service that is configured to interact with other hardware and/or software components to support the solution. In various other examples, solutions are offered to customers in a manner that allows the customers to use a combination of existing devices, upgraded devices, new devices, existing software, upgraded software, new software, existing services, upgraded services, and/or new services to accomplish a functionality that supports the solution.

Example operating hybrid solutions provided by Cisco Systems, Inc., of San Jose, Calif., include, for example, products from the Borderless Networks family such as EnergyWise, TrustSec, MediaNet, Application Velocity, and Motion products. In one example, EnergyWise enabled devices operate together to provide an energy solution that helps customers remotely monitor, optimize and manage the power used by the devices. In another example, TrustSec enabled devices operate together to enforce security policies across devices. In yet another example, MediaNet enabled devices detect and optimize video traffic on the network. The Application Velocity product enables devices to improve HTML-based and XML-based application performance. In a fifth example, Motion enabled devices operate together to overcome barriers of distance and time to enable people to connect to a customer's network from virtually anywhere via any network. Other combinations of hardware and/or software, developed by Cisco Systems, Inc. or others, provide other operating hybrid solutions to customers.

During the usable life of a device, the device may be part of several different operating hybrid solutions. Further, the mere fact that the customer owns a device that typically supports a solution does not mean that the customer is actually using the device to support the solution. Therefore, the mere hardware identity of a device is not sufficient for determining whether the device is being used as part of an operating hybrid solution on the customer's network.

In one embodiment, a customer, support service provider, or other human being or entity discovers information about the devices on the customer's network. Based on the information, the entity registers, with solution monitoring logic, that a device is being used as part of an operating hybrid solution. The solution monitoring logic stores information that indicates the device is part of the operating hybrid solution.

In another embodiment, an automatic determination is made as to whether the device is being used as part of an operating hybrid solution, and information is stored that indicates the device is part of the operating hybrid solution. The automatic determination may be based on mappings that are generated and/or provided by a customer, human being, or other entity with information about operating criteria that describe devices when the devices are operating according to the operating hybrid solution.

In one embodiment, solution monitoring logic stores mappings of operating hybrid solutions to operating criteria that describe devices when the devices are operating according to the operating hybrid solutions. The mappings may include mappings that are generic with respect to physical device identifiers such as model and/or manufacturer information and instead rely on runtime criteria that may change during operation of the devices and/or boottime criteria that may change the manner in which the device boots up. In a particular example, the mappings may rely on physical device identifiers, runtime criteria, and boottime criteria.

Whether or not a device is part of a particular operating hybrid solution may depend on the runtime characteristics of the device and the runtime criteria to which the particular operating hybrid solution is mapped. Devices may have runtime criteria at one point during operation but, due to a change in connectivity or some other change to the devices, not at another point during operation. The techniques described herein may be applied to any runtime criteria that may change during operation of the device, causing the device to either be a part of or not be a part of the particular operating hybrid solution. The runtime criteria may account for information about a single device or information about a set of two or more devices in direct or indirect communication with each other over a network of devices. The network of devices may span several local networks, and the devices may communicate with each other at any layer of the Open Systems Interconnection (OSI) model.

Whether or not a device is part of a particular operating hybrid solution may depend on boottime characteristics or configurations of the device and the boottime criteria to which the particular operating hybrid solution is mapped. In one example, boottime criteria is persistent to multiple reboots of the device. Devices of the same type and model may have different boottime criteria at different points during the lifetimes of the devices. The techniques described herein may be applied to any boottime criteria that may change the manner in which a particular device operates, causing the device to either be a part of or not be a part of the particular operating hybrid solution. The boottime criteria may account for information about a single device or information about a set of two or more devices in direct or indirect communication with each other over a network of devices.

Information about whether or not a device is part of an operating hybrid solution may be requested to support management of the device, maintenance of the device, troubleshooting of the device, for auditing purposes, to analyze the effectiveness or efficiency of solutions, or for some other reason. In one embodiment, a customer, support service provider, other human being, or other entity submits a request, to an operating hybrid solution interface, for information about whether or not a monitored device is operating as part of an operating hybrid solution. In response to the request, the solution interface provides information that indicates whether or not the monitored device is operating as part of the operating hybrid solution.

In a particular example, a support service provider receives a support inquiry about the device, and the support service provider uses an operating hybrid solution interface to provide information about whether or not the device is operating as part of the operating hybrid solution. The support inquiry may be routed to a specialized agent based on whether or not the device is part of the operating hybrid solution. For example, agents may be trained to handle issues concerning a subset of operating hybrid solutions offered by a solution provider, and the inquiry may be routed to an agent that has been trained to handle issues for one or more operating hybrid solutions to which the customer's device belongs. Optionally, the support service provider may track the frequency, length, and cost of support requests on a solution-by-solution basis.

Various embodiments feature solution monitoring logic for maintaining information about the operating hybrid solutions to which devices are a part, and an operating hybrid solution interface for providing the information to other entities. The solution interface and/or the solution monitoring logic may be on a network management system ("NMS") separate from the device, on the monitored device itself, distributed among monitored devices, or distributed between the NMS and the monitored device.

FIG. 1 illustrates an example server that maintains stored associations between devices and operating hybrid solutions to which the devices are a part. FIG. 1 illustrates an example of a server computer 104 that is separate from monitored devices 110-114. The server computer 104 includes operating hybrid solution monitoring logic 102 that uses stored mappings between operating hybrid solutions and operating criteria 106 to determine whether devices 110-114 are part of an operating hybrid solution. Operating hybrid solution monitoring logic 102 compares operating criteria from mapping 106 to received information about characteristics of devices 110-114. If a device has a operating criteria for an operating hybrid solution, as specified by mapping 106, then operating hybrid solution monitoring logic 102 stores an association between the device and the operating hybrid solution in stored associations between devices and operating hybrid solutions 108. For example, the associations may be stored in a database according to the device address or the hardware identifier of the device.

As shown in FIG. 1, server computer 104 also includes operating hybrid solution interface 101 for receiving requests from support service provider 100. In one example, operating hybrid solution interface 101 receives a request for solution information about a device from monitored devices 110-114. In response, operating hybrid solution interface 101 looks up the device in stored associations 108, and provides information to support service provider about the operating hybrid solutions to which the device is a part. The provided information may be provided in any format that indicates whether or not the device is a part of one or more operating hybrid solutions.

Figure 2:
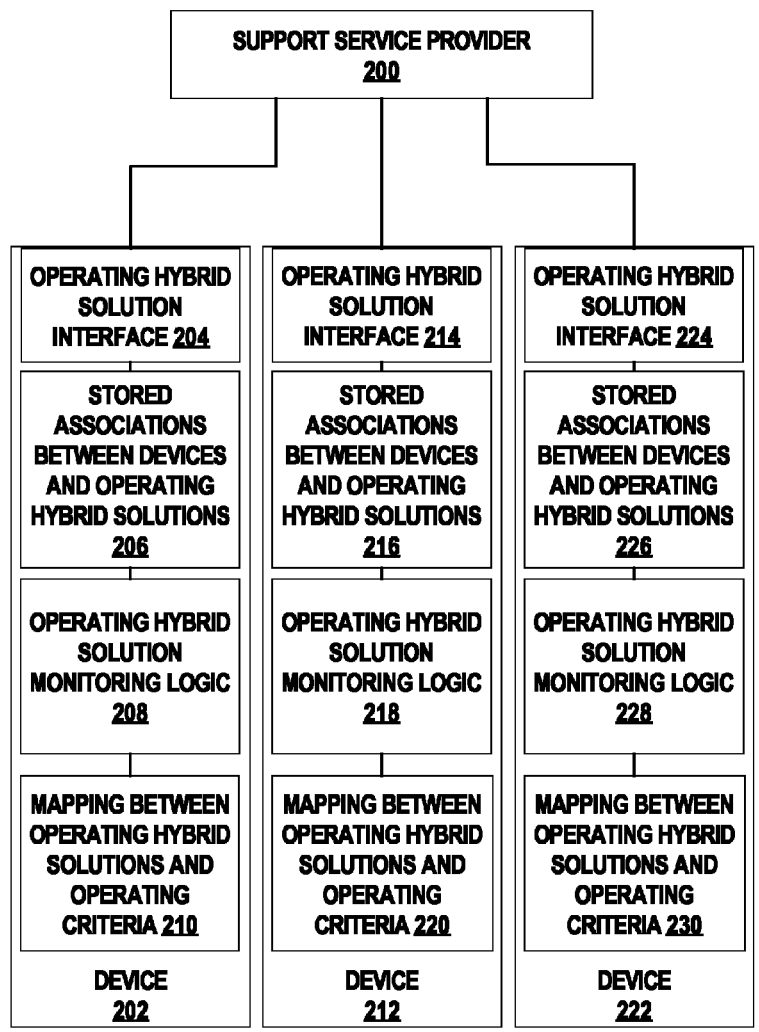
FIG. 2 illustrates example devices that maintain stored indications of whether the devices are part of operating hybrid solutions.

FIG. 2 illustrates example devices that maintain stored indications of whether the devices are part of operating hybrid solutions. FIG. 2 illustrates an example of devices 202, 212, 222 that include separate operating hybrid solution interfaces 204, 214, and 224, respectively, and separate operating hybrid solution monitoring logic 208, 218, and 228, respectively. In other embodiments not shown, various components may be implemented on various different devices, which may or may not include a centralized server.

In an embodiment, a support service provider submits requests for solution information directly to a device, such as device 212 via operating hybrid solution interface 214. Operating hybrid solution interface 214 accesses stored associations 216 to provide information about whether the device belongs to particular operating hybrid solutions. Stored associations 216 are updated by operating hybrid solution monitoring logic 218 based on a mapping between operating hybrid solutions and operating criteria 220.

3.0 Identifying Operating Hybrid Solutions

Operating hybrid solutions are mapped to operating criteria such that changing operating characteristics of a device may cause the device to either be a part of or not be a part of the operating hybrid solution. Various examples of operating criteria are provided. However, the techniques described herein are not limited to any particular example. Any number of the example operating criteria may be combined together in any manner, and this disclosure contemplates every combination of the example operating criteria.

In one embodiment, an operating hybrid solution is mapped to two or more operating criteria. Different types of devices may require different operating criteria in order to be a part of an operating hybrid solution. In various embodiments, a device-specific mapping from an operating hybrid solution to operating criteria depends on a hardware identity, address, or other information about a device. In other words, different device-specific mappings may be specified for different types of devices and for different operating hybrid solutions. For example, the mapping may specify a first set of criteria if the device has a first type, model, or hardware identity, and a second set of criteria if the device has a second type, model, or hardware identity.

In a first example, the operating criteria accounts for whether or not a set of one or more devices are configured according to a particular configuration parameter. In one embodiment, an operating device, such as a Cisco Catalyst switch, is configured with configuration syntax that at least partially enables a functionality associated with an operating hybrid solution to which the device is a part. Solution monitoring logic scans configuration files of the switch to determine whether the configuration files include the configuration syntax, such as configuration syntax for configuring a port of the switch according to a security authentication protocol. In one embodiment, if a configuration parameter such as the specified configuration syntax is present, then the device has the operating criterion. If the configuration parameter is not present, then the device does not have the operating criterion. Another operating criterion may additionally account for whether the device or another device has another configuration parameter.

In a second example, the operating criteria accounts for whether or not a specified type of device is operating in the set of one or more devices. In one embodiment, solution monitoring logic stores information received in Cisco Discovery Protocol ("CDP") announcements from the set of devices. Example information reported by CDP may include the device name, software release version for the device, hardware platform name for the device, a set of network prefixes to which the device can forward IP packets (including interface protocol and port number), device type or functionality, power draw (for Power over Ethernet devices), and other device specific information. In another embodiment, the information is received from Link Layer Discovery Protocol ("LLDP") announcements, which may also be used by the devices for advertising their identity, capabilities, and neighbors. A criterion may be based on any of the reported information from the devices, or based on any information retrieved from the devices.

In a particular example, solution monitoring logic determines whether the set of one or more devices includes a device with a particular software release version, a particular hardware platform name, or a particular device type, such as a switch. In another example, the particular device type specified by the criteria is a type of hardware module that is plugged into a device. If the specified type of device is operating in the set of one or more devices, either as a particular device or in direct or indirect communication with a particular device, then the particular device has the operating criterion. If the specified type of device is not operating in the set of one or more devices, then the particular device does not have the operating criterion. Another operating criterion may additionally account for whether the device or another device qualifies as another type of device.

In a third example, the operating criteria accounts for whether or not a specified communication protocol is in use by the set of one or more devices. In one embodiment, solution monitoring logic submits a "show ip rsvp" command to a device to determine if the device is running Resource Reservation Protocol ("RSVP"). In one embodiment, if the device is running the specified protocol, then the device has the operating criterion. If the device is not running the specified protocol, then the device does not have the operating criterion. Another operating criterion may additionally account for whether the device or another device is running another protocol.

In a fourth example, the operating criteria accounts for whether or not a specified process is running on the set of one or more devices. In one embodiment, solution monitoring logic scans the running processes on a Catalyst switch to determine whether the running processes include an EnergyWise protocol that supports power over Ethernet. The set of running processes may be scanned to determine whether one or more process names are present. In one embodiment, if the specified process is not running on the device, then the device does not have the operating criterion. If the specified process is running on the device, then the device has the operating criterion. Another operating criterion may additionally account for whether the device or another device has another process running.

In a fifth example, the operating criteria accounts for whether a specified license is active on the set of one or more devices. In one embodiment, activation of a license on a device unlocks functionality provided by a combination of hardware and software components. In one embodiment, solution monitoring logic scans the device to determine whether or not an electronic license is stored and/or active on the device. In another embodiment, an indication of whether or not the license is active on the device is available from a NMS that manages the device. If the license is active, then the device has the operating criterion. If the license is not active, then the device does not have the operating criterion. Another operating criterion may additionally account for whether the device or another device has another license active.

In a sixth example, the operating criteria accounts for whether a service is provided by and/or utilized by a set of one or more devices. In one embodiment, devices operating together to provide or use a service are uniquely equipped with a particular functionality. Solution monitoring logic may scan the devices to determine whether or not the service is being provided or utilized by the devices. For example, a configuration parameter on a device may specify whether or not the device is operating to provide and/or utilize the service. In a particular example, the solution monitoring logic determines whether the a set of devices are providing a Cisco WebEx web conferencing solution featuring integrated voice, video and simplified mobile access. If the devices are providing and/or utilizing the service, then the devices have the operating criterion. If the devices are not providing and/or utilizing the service, then the devices do not have the operating criterion. Another operating criterion may additionally account for whether the device or another device is providing and/or using another service.

In a seventh example, the operating criteria include one or more dynamic operating criteria that account for a state and role of a device among a network of devices. In one embodiment, solution monitoring logic scans a first device not only to determine whether or not a first device has a first operating criterion, but also to determine whether the first device is in communication with a second device that has a second operating criterion. Thus, the determination of whether or not the device is part of an operating hybrid solution is based not only on information about the device itself, but also on information about the relationship between the device and other devices as the device operates in the network. The first device has the dynamic criterion if the second device has the second criterion and if the first device is in communication with the second device. Another dynamic criterion may be based on the first device and the second device or the first device and a third device.

In a particular example, the criteria may specify that a device is part of an operating hybrid solution if the device is an IP phone, and if the IP phone is connected to a particular type of network-connected device such as a call manager. A discovery-based protocol or a client-server based protocol may be used to determine whether the IP phone is neighbors with any call managers. At any given time, the IP phone may or may not be connected to a neighbor that satisfies the dynamic criterion. The solution monitoring logic may detect, at one time, that the IP phone is part of the operating hybrid solution, but, at another time, that the IP phone is not part of the operating hybrid solution. The connectivity of a device to its neighbors may change as the device operates in the network.

3.1 Process of Detecting Whether Devices have Operating Criteria Specified by a Mapping The solution monitoring logic is not limited to any particular manner for receiving information from monitored devices. In one embodiment, the solution monitoring logic receives notifications (pushes) from the devices regarding changes in operating characteristics. The notifications may be provided as separate messages regarding changes in operating characteristics, or the notifications may be piggybacked onto messages according to protocols already established between an NMS and the monitored devices. In another embodiment, the solution monitoring logic periodically polls the devices with requests for updated operating characteristics. In yet another embodiment, the solution monitoring logic retrieves information about updated characteristics from the devices in response to receiving an inquiry about the device from another entity such as a support service provider. For example, updated information may be retrieved from the device when the customer contacts the support service provider to troubleshoot the device.

In various other embodiments, information about a device may be retrieved from neighbors of the device. For example, a Cisco device may provide information about neighboring devices from other manufacturers that are, directly or indirectly, in communication with the Cisco device. In a particular example, the Cisco device reports that another device is in communication with the Cisco device using an IPsec protocol.

In one example, a TrustSec operating hybrid solution is mapped to criteria that include: (1) the IEEE 802.1X protocol is running in the set of devices, (2) the set of devices is tagging packets using security group tagging ("SGT"), and (3) the set of devices includes a Network Admission Control ("NAC") device. IEEE 802.1X is an IEEE standard protocol for port-based Network Access Control ("PNAC") that authenticates devices for a Local Area Network ("LAN") or Wireless LAN ("WLAN"). The mapping may be provided by a human user, by a software client, or by any other entity with information about the unique characteristics of devices that are part of the operating hybrid solution. SGT allows packets to be identified for application of security policies. A NAC device authenticates users attempting to access the network. The three technologies operate together in TrustSec implementations.

In one embodiment, solution monitoring logic detects whether or not a set of devices on the customer's network have the TrustSec operating hybrid solution. For example, a first device may be running the IEEE 802.1X protocol, a second device may be tagging packets using SGT, and a third device may be a NAC device. The solution monitoring logic may determine that the three devices are operating together to provide the TrustSec operating hybrid solution. If the set of devices stops providing any of the three specified criteria, then the solution monitoring logic detects that the set of devices is no longer a part of a TrustSec implementation. If a set of devices transitions from not providing the three specified criteria to providing the three specified criteria, then the solution monitoring logic detects that the set of devices is now a part of a TrustSec implementation.

Figure 3:
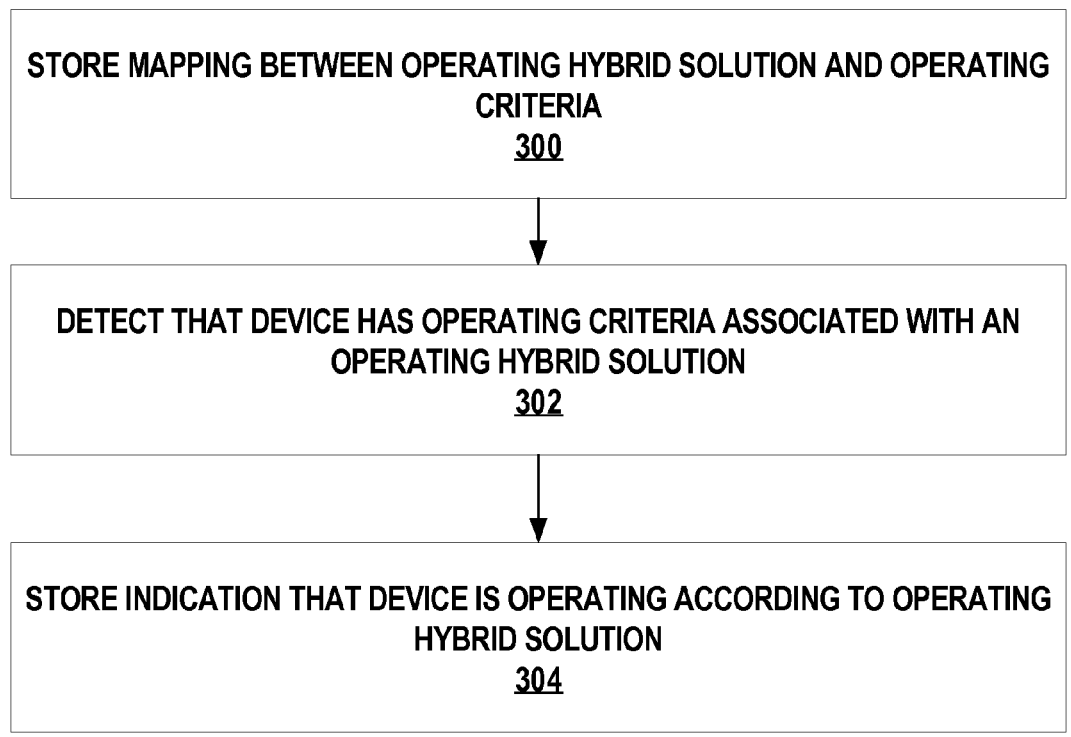
FIG. 3 is a flow chart illustrating a process of maintaining stored indications of whether a device is operating according to an operating hybrid solution.

FIG. 3 is a flow chart illustrating a process of maintaining stored indications of whether a device is operating according to an operating hybrid solution.

In step 300, a mapping is stored between an operating hybrid solution and operating criteria. For example, the mapping may be stored on one or more non-transitory computer-readable storage media such as one or more volatile memory chips or one or more non-volatile disks. In a particular example, the mapping is stored in an operating hybrid solution table in a database. Different rows of the table may be associated with different operating hybrid solutions.

In step 302, device monitoring logic detects that a device has operating criteria associated with an operating hybrid solution. For example, the device monitoring logic may receive information from the device and compare the information with an entry in the operating hybrid solution table. If the device has all of the criteria specified for the entry, then the device has the operating hybrid solution associated with the entry.

In step 304, the device monitoring logic stores an indication that a device is operating according to an operating hybrid solution. For example, a device table may store information about operating hybrid solutions to which the device is a part. Different rows of the table may be associated with different devices, and different columns of the table may be associated with different operating hybrid solutions. If the value of the column is "1" or "True," then the device has the operating hybrid solution associated with the column. If the value of the column is "0" or "False," then the device does not have the operating hybrid solution associated with the column. Further, if the value of the column is "NULL," then the solution monitoring logic may not yet have enough information to determine whether or not the device is part of the operating hybrid solution. In one embodiment, the solution monitoring logic responds to a request for operating hybrid solution information associated with a particular device by accessing the stored information without verifying that the particular device has a plurality of operating criteria associated with the operating hybrid solution.

In one embodiment, the solution monitoring logic changes the value to "NULL" after the expiration of a solution timer. In this manner, the solution monitoring logic may prevent stale indications from affecting decisions by support service providers using the stored indications.

3.2 Process of Handling Requests for Operating Hybrid Solutions Associated with a Device In one embodiment, an operating hybrid solution management system provides an operating hybrid solution interface to a support service provider. The support service provider uses the solution interface to process inquiries received about supported devices. For example, a customer such as a member of an information technology department may call the support service provider to request technical support for one or more of the customer's devices. The support service provider may use the solution interface to determine whether or not the customer's devices belong to one or more operating hybrid solutions. The support service provider may then process the call based on which operating hybrid solutions are being provided by the customer's devices.

In one embodiment, the support service provider processes a call by routing the call to a technician or agent that is specialized to handle calls for a subset of operating hybrid solutions supported by the support service provider. In another embodiment, the support service provider may process the call by suggesting products or solutions that are not provided by the customer's devices. For example, the support service provider may detect that the customer is running a first version of a solution, but that the customer has not yet upgraded to a second version of the solution, such as upgraded hardware or software. Based on this information, the support service provider may recommend the second version of the solution to the customer. In another example, the support service provider may detect that some of the customer's networks provide an operating hybrid solution, but others of the customer's networks do not provide the operating hybrid solution. The support service provider may detect these gaps based on information from the operating hybrid solution interface, and the support service provider may recommend solutions to fill the gaps.

In the TrustSec example, a customer who has implemented TrustSec contacts a support service provider with a service inquiry about a given device on the customer's network. The customer contacts a support service provider with the service inquiry. Rather than routing the service inquiry to a TrustSec specialist due to the presence of a NAC device on the customer's network, the support service provider may automatically determine that the given device is not part of TrustSec. For example, the support service provider may request solution information for the device from the solution monitoring logic. The solution monitoring logic responds with information that indicates the device is not part of TrustSec. In response, the support service provider may route the service inquiry to an agent that specializes in another solution, or to an agent that specializes in general service calls.

On the other hand, if the device is part of a set of devices that operate together to provide TrustSec, then the solution monitoring logic responds to the request with information that indicates the device is part of a TrustSec implementation. Accordingly, the support service provider may efficiently route the service inquiry to a TrustSec specialist.

Figure 4:
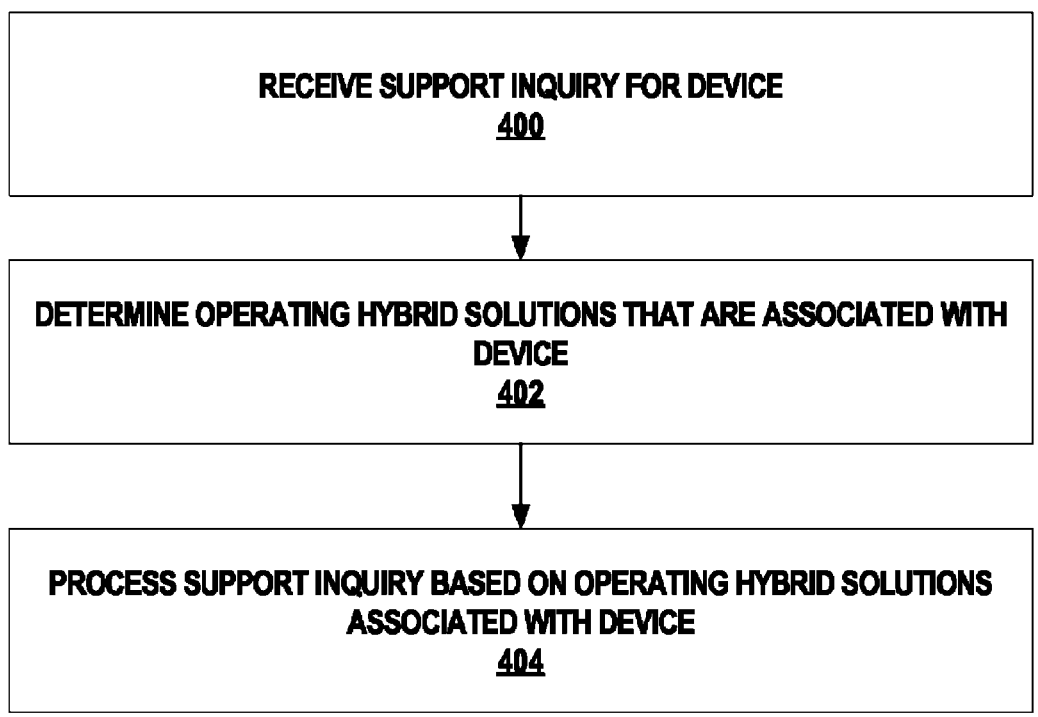
FIG. 4 is a flow chart illustrating a process for handling support inquiries for a device in a manner that accounts for whether the device is operating according to an operating hybrid solution.

FIG. 4 is a flow chart illustrating a process for handling support inquiries for a device in a manner that accounts for whether the device is operating according to an operating hybrid solution.

In step 400, a support service provider receives a support inquiry for a customer's device. The support service provider uses the hybrid operating solution interface to automatically determine, in step 402, operating hybrid solutions that are associated with the customer's device. In step 404, the support service provider processes the support inquiry based on operating hybrid solutions associated with the device.

In one embodiment, the support service provider uses information about the hybrid operating solutions to analyze which solutions trigger the most support calls. For example, each time a customer contacts a support service provider for service, the support service provider may use the hybrid operating solution interface to automatically map the support instance to an operating hybrid solution that triggered the support instance. The support service provider may keep track of time, costs, and other information associated with the support instances. The tracked information may be used to determine which solutions are most efficient, and to identify technologies that should be improved.

4.0 Implementation Mechanisms—Hardware Overview

Figure 5:
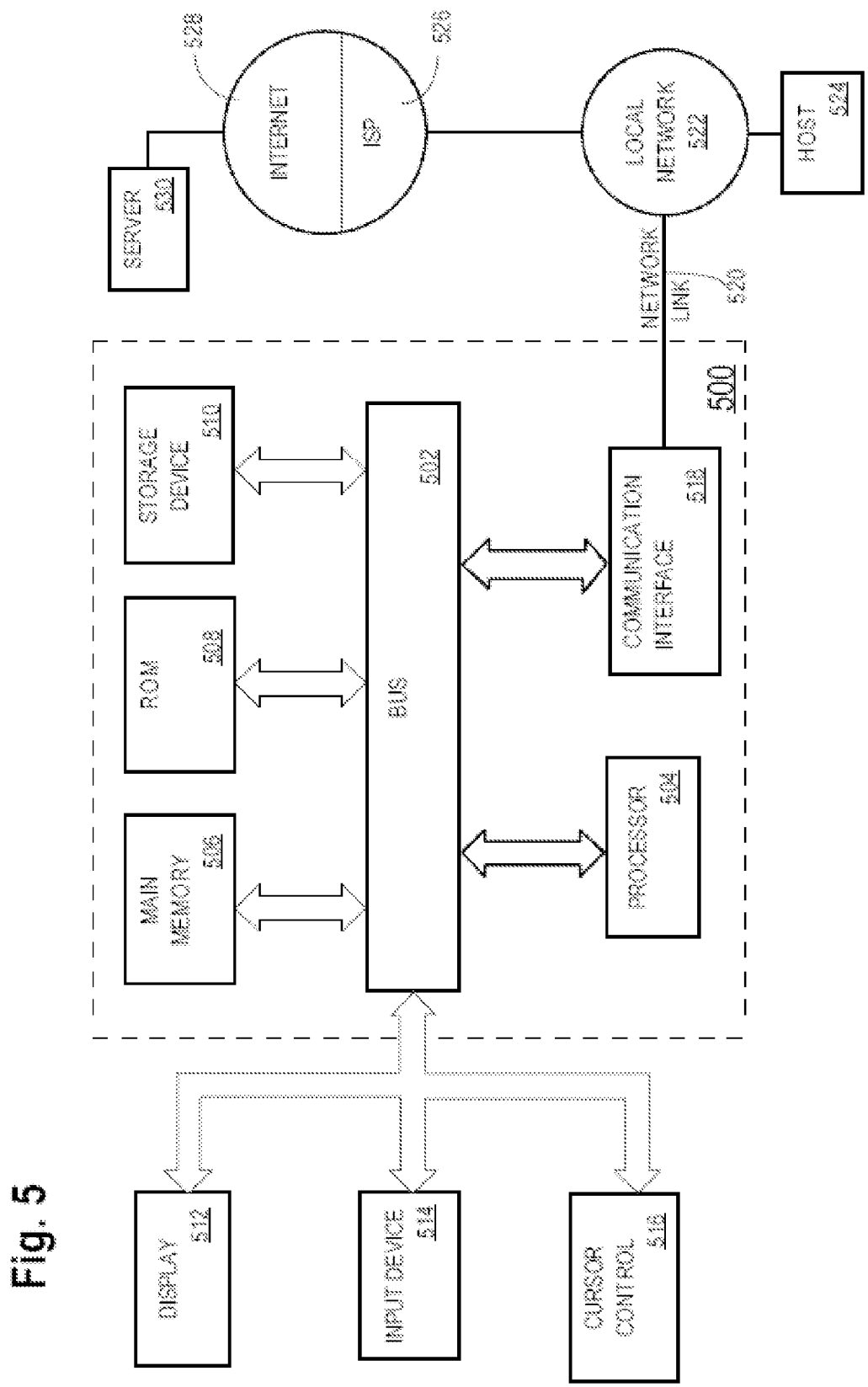
FIG. 5 illustrates a computer system upon which an embodiment may be implemented.

FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In one embodiment, computer system 500 is used to implement the techniques described herein. For example, the techniques may be performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the techniques described herein. Thus, various embodiments are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In one embodiment, the techniques described herein are implemented by a switching system that is coupled to a bus and has an input interface and an output interface to one or more external network elements. The external network elements may include a local network coupled to one or more hosts, or a global network such as Internet having one or more servers. The switching system switches information traffic arriving on the input interface to the output interface according to pre-determined protocols and conventions that are well known. For example, the switching system, in cooperation with one or more processors, can determine a destination of a packet of data arriving on the input interface and send it to the correct destination using the output interface. The destinations may include a host, a server, other end stations, or other routing and switching devices in local network or Internet. In one embodiment, the monitored devices include switches.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage media storing:
   a mapping between an operating hybrid solution and two or more operating criteria of one or more networked devices;
   wherein the one or more networked devices have a first operating criterion of the two or more operating criteria when a first functional component of the one or more networked devices is currently providing a first functionality, and wherein the one or more networked devices have a second operating criterion of the two or more operating criteria when a second functional component of the one or more networked devices is currently providing a second functionality, wherein the first functionality is different from the second functionality;
   wherein the mapping indicates that the one or more networked devices are currently providing the operating jybrid solution when the one or more networked devices have each of the two or more operating criteria;
   instructions which, when executed by one or more processors, cause:
      receiving a request to determine whether one or more particular devices are currently operating to provide the operating hybrid solution;
      based at least in part on the stored mapping:
         during operation of the one or more particular devices, detecting whether the one or more particular devices have each of the two or more operating criteria, and
         in response to detecting that the one or more particular devices have each of the two or more operating criteria, storing an indication that the one or more particular devices is currently operating according to the operating hybrid solution;
      based at least in part on the stored indication, sending a response to the request, wherein the response indicates that the one or more particular devices is currently operating according to the operating hybrid solution.

2. The one or more non-transitory computer-readable storage media recited in claim 1, wherein, when the one or more networked devices is operating according to the operating hybrid solution, but not when the one or more networked devices is not operating according to the operating hybrid solution, the one or more networked devices support one or more of remote monitoring and management of power usage by the devices; enforcement of security policies across the devices; detection and optimization of video traffic; or improvement of HTML-based and XML-based application performance.

3. The one or more non-transitory computer-readable storage media recited in claim 1, wherein at least one of the two or more operating criteria comprises whether the one or more networked devices is configured according to a particular configuration parameter.

4. The one or more non-transitory computer-readable storage media recited in claim 1, wherein at least one of the two or more operating criteria comprises whether a specified type of device is operating among the one or more networked devices.

5. The one or more non-transitory computer-readable storage media recited in claim 1, wherein at least one of the two or more operating criteria comprises whether a specified communication protocol is in use by the one or more networked devices during operation.

6. The one or more non-transitory computer-readable storage media recited in claim 1, wherein at least one of the two or more operating criteria comprises whether a specified process is running on the one or more networked devices.

7. The one or more non-transitory computer-readable storage media recited in claim 1, wherein at least one of the two or more operating criteria comprises whether a specified license is active on the one or more networked devices.

8. The one or more non-transitory computer-readable storage media recited in claim 1, wherein the two or more operating criteria further comprise whether a first device has the first operating criterion, and whether the first device is in communication with a second device that has the second operating criterion; and wherein the instructions, when executed by the one or more processors, cause determining whether the one or more particular devices are currently operating to provide the operating hybrid solution at least in part by:
    detecting whether the one or more particular devices have each of the two or more operating criteria by detecting whether a first particular device of the one or more particular devices has the first operating criterion and whether the first particular device is in communication with a second particular device of the one or more particular devices that has the second operating criterion.

9. The one or more non-transitory computer-readable storage media recited in claim 1, wherein the instructions, when executed by the one or more processors while the one or more particular devices is operating, further cause receiving input that specifies that the one or more particular devices is operating according to a second operating hybrid solution; storing a second indication that the one or more particular devices is operating according to the second operating hybrid solution; and responding to another request to determine whether the one or more particular devices is operating to the second operating hybrid solution by accessing the stored second indication without verifying that the one or more particular devices have a plurality of operating criteria associated with the second operating hybrid solution.

10. The one or more non-transitory computer-readable storage media recited in claim 1, wherein the request is received after the indication is stored, and wherein the response is sent based at least in part on the stored indication and without re-performing the step of detecting that the one or more particular devices have each of the two or more operating criteria.

11. A method comprising:
    storing a mapping between an operating hybrid solution and two or more operating criteria of one or more networked devices;
    wherein the one or more networked devices have a first operating criterion of the two or more operating criteria when a first functional component of the one or more networked devices is currently providing a first functionality, and wherein the one or more networked devices have a second operating criterion of the two or more operating criteria when a second functional component of the one or more networked devices is currently providing a second functionality, wherein the first functionality is different from the second functionality;
    wherein the mapping indicates that the one or more networked devices are currently providing the operatingjybrid solution when the one or more networked devices have each of the two or more operating criteria;
    receiving a request to determine whether one or more particular devices are currently operating to provide the operating hybrid solution;
    based at least in part on the stored mapping:
        during operation of the one or more particular devices, detecting whether the one or more particular devices have each of the two or more operating criteria, and
        in response to detecting that the one or more particular devices have each of the two or more operating criteria, storing an indication that the one or more particular devices is currently operating according to the operating hybrid solution;
    based at least in part on the stored indication, sending a response to the request, wherein the response indicates that the one or more particular devices is currently operating according to the operating hybrid solution;
    wherein the method is performed by one or more computing devices.

12. The method recited in claim 11, wherein, when the one or more networked devices is operating according to the operating hybrid solution, but not when the one or more networked devices is not operating according to the operating hybrid solution, the one or more networked devices support one or more of remote monitoring and management of power usage by the devices; enforcement of security policies across the devices; detection and optimization of video traffic; or improvement of HTML-based and XML-based application performance.

13. The method recited in claim 11, wherein at least one of the two or more operating criteria comprises whether a specified type of device is operating among the one or more networked devices.

14. The method recited in claim 11, wherein at least one of the two or more operating criteria comprises whether a specified communication protocol is in use by the one or more networked devices during operation.

15. The method recited in claim 11, wherein at least one of the two or more operating criteria comprises whether a specified process is running on the one or more networked devices.

16. The method recited in claim 11, wherein at least one of the two or more operating criteria comprises whether a specified license is active on the one or more networked devices.

17. The method recited in claim 11, wherein the two or more operating criteria comprise whether a first device has the first operating criterion, and whether the first device is in communication with a second device that has the second operating criterion; and wherein determining whether the one or more particular devices are currently operating to provide the operating hybrid solution comprises:
    detecting whether the one or more particular devices have each of the two or more operating criteria at least in part by detecting whether a first particular device of the one or more particular devices has the first operating criterion and whether the first particular device is in communication with a second particular device of the one or more particular devices that has the second operating criterion.

18. The method recited in claim 11, further comprising, during operation of the one or more particular devices, receiving a support inquiry for the one or more particular devices; processing the support inquiry for the one or more particular devices based at least in part on one or more operating hybrid solutions according to which the one or more particular devices is operating.

19. The method recited in claim 11, wherein the request is received after the indication is stored, and wherein the response is sent based at least in part on the stored indication and without re-performing the step of detecting that the one or more particular devices have each of the two or more operating criteria.

20. One or more computing devices comprising:
one or more processors;
one or more non-transitory computer-readable storage media storing:
a mapping between an operating hybrid solution and two or more operating criteria of one or more networked devices;
wherein the one or more networked devices have a first operating criterion of the two or more operating criteria when a first functional component of the one or more networked devices is currently providing a first functionality, and wherein the one or more networked devices have a second operating criterion of the two or more operating criteria when a second functional component of the one or more networked devices is currently providing a second functionality, wherein the first functionality is different from the second functionality;
wherein the mapping indicates that the one or more networked devices are currently providing the operating hybrid solution when the one or more networked devices have each of the two or more operating criteria;
solution monitoring logic coupled to the one or more processors, wherein the solution monitoring logic is configured to cause:
receiving a request to determine whether one or more particular devices are currently operating to provide the operating hybrid solution;
based at least in part on the stored mapping:
during operation of the one or more particular devices, detecting whether the one or more particular devices have each of the two or more operating criteria, and
in response to detecting that the one or more particular devices have each of the two or more operating criteria, storing an indication that the one or more particular devices is currently operating according to the operating hybrid solution;
based at least in part on the stored indication, sending a response to the request, wherein the response indicates that the one or more particular devices is currently operating according to the operating hybrid solution.

21. The one or more computing devices recited in claim 20, wherein, when the one or more networked devices is operating according to the operating hybrid solution, but not when the one or more networked devices is not operating according to the operating hybrid solution, the one or more networked devices support one or more of remote monitoring and management of power usage by the devices; enforcement of security policies across the devices; detection and optimization of video traffic; or improvement of HTML-based and XML-based application performance.

22. The one or more computing devices recited in claim 20, wherein at least one of the two or more operating criteria comprises whether a specified type of device is operating among the one or more networked devices.

23. The one or more computing devices recited in claim 20, wherein at least one of the two or more operating criteria comprises whether a specified communication protocol is in use by the one or more networked devices during operation.

24. The one or more computing devices recited in claim 20, wherein at least one of the two or more operating criteria comprises whether a specified process is running on the one or more networked devices.

25. The one or more computing devices recited in claim 20, wherein at least one of the two or more operating criteria comprises whether a specified license is active on the one or more networked devices.

26. The one or more computing devices recited in claim 20, wherein the two or more operating criteria comprise whether a first device has the first operating criterion, and whether the first device is in communication with a second device that has the second operating criterion; and wherein the solution monitoring logic determines whether the one or more particular devices are currently operating to provide the operating hybrid solution at least in part by:
detecting whether the one or more particular devices have each of the two or more operating criteria by detecting whether a first particular device of the one or more particular devices has the first operating criterion and whether the first particular device is in communication with a second particular device of the one or more particular devices that has the second operating criterion.

27. The one or more computing devices recited in claim 20, wherein the request is received after the indication is stored, and wherein the response is sent based at least in part on the stored indication and without re-performing the step of detecting that the one or more particular devices have each of the two or more operating criteria.

* * * * *

UNITED STATES PATENT AND TRADEMARK OFFICE
CERTIFICATE OF CORRECTION

PATENT NO. : 8,782,212 B2  
APPLICATION NO. : 13/024167  
DATED : July 15, 2014  
INVENTOR(S) : Pignataro et al.

It is certified that error appears in the above-identified patent and that said Letters Patent is hereby corrected as shown below:

In the claims:

Claim 1, column 14, lines 26-27   Delete "operatingiy-brid" and insert --operating hybrid--

Claim 9, column 15, line 44   After "operating" insert --according--

Claim 11, column 16, lines 4-5   Delete "operatingiy-brid" and insert --operating hybrid--

Signed and Sealed this  
Seventh Day of October, 2014

Michelle K. Lee  
*Deputy Director of the United States Patent and Trademark Office*